United States Patent [19]
Wittenstein et al.

[11] Patent Number: 5,791,191
[45] Date of Patent: Aug. 11, 1998

[54] GEAR CAPABLE OF BEING FLANGED ONTO AN ELECTRIC MOTOR

[75] Inventors: Manfred Wittenstein, Mergentheim; Manfred Wolfart, Weikersheim, both of Germany

[73] Assignee: Alpha Getriebebau GmbH, Igersheim, Germany

[21] Appl. No.: 669,401

[22] PCT Filed: Dec. 27, 1994

[86] PCT No.: PCT/DE94/01536

§ 371 Date: Jun. 21, 1996

§ 102(e) Date: Jun. 21, 1996

[87] PCT Pub. No.: WO95/19514

PCT Pub. Date: Jul. 20, 1995

[30] Foreign Application Priority Data

Jan. 17, 1994 [DE] Germany .................. 44 01 164.4

[51] Int. Cl.[6] .................. F16H 57/02; F16D 1/04
[52] U.S. Cl. .................. 74/421 A; 74/606 R; 403/3; 403/344
[58] Field of Search .................. 74/421 A, 606 R; 403/3, 312, 344

[56] References Cited

U.S. PATENT DOCUMENTS

| | | | |
|---|---|---|---|
| 404,300 | 5/1889 | Perkins | 403/344 X |
| 3,434,366 | 3/1969 | Raso et al. | 74/421 A |
| 3,851,983 | 12/1974 | MacKenzie | 403/312 |
| 3,937,096 | 2/1976 | Lundin et al. | 74/421 A |
| 4,111,069 | 9/1978 | Blair et al. | 74/606 R |
| 4,269,075 | 5/1981 | Crist et al. | 74/421 A X |
| 4,811,616 | 3/1989 | Henderson | 74/421 A |
| 4,848,951 | 7/1989 | Boogerman et al. | 403/344 X |
| 5,052,842 | 10/1991 | Janatka | 403/14 |

FOREIGN PATENT DOCUMENTS

| | | |
|---|---|---|
| 0381829 | 8/1990 | European Pat. Off. . |
| 0567048 | 10/1993 | European Pat. Off. . |
| 1176959 | 8/1964 | Germany . |
| 2347523 | 3/1975 | Germany . |
| 3502015 | 7/1986 | Germany . |

*Primary Examiner*—Allan D. Herrmann
*Attorney, Agent, or Firm*—Collard & Roe, P.C.

[57] ABSTRACT

In a gear which can be flanged onto an electric motor, especially a low-clearance planetary gear, with a hollow shaft to make a positive connection with the electric motor output shaft, an easily manufactured and reliable centering system is to be provided between the gear and the electric motor (6). To this end, the section of the hollow shaft (9) accepting the output shaft (10) of the electric motor is centrically secured on roller bearings (11) and the face of the drive flange is radially freely centerable (7, 8) in relation to the mating surface of the electric motor. To enable a drive with as uniform a basic structure as possible to be connected to electric motors with different connecting geometries, the gear has an interchangeable mating plate (2) forming its connecting flange and a hollow shaft into which compensating sleeves (12) can be inserted to accept electric motor output shafts of different diameters.

4 Claims, 1 Drawing Sheet

GEAR CAPABLE OF BEING FLANGED ONTO AN ELECTRIC MOTOR

BACKGROUND OF THE INVENTION

1. Field of the Invention

The invention relates to a gear flanged onto an electric.

2. The Prior Art

In hitherto known gears of this type, in the case of direct flanging the electric motor is in each case centered radially on the gear flange, for which purpose a centering collar mounted in one of the two parts engages with an exact fit into a corresponding inner centering of the other part.

In centering of this type, if manufacturing tolerances of the centering surfaces meet in an unfavorable manner a distorted mounting of the electric motor output shaft relative to the hollow shaft receiving this may occur. Moreover, the production of the respective centering surfaces involves a high outlay in terms of manufacture.

Furthermore, it is known from EP 0,381,829 A1 to flange the electric motor onto the gear via an elastic multipart connecting element and to provide radially centering-free bearing surfaces within the individual parts of this element. This mode of connection is complicated in terms of construction and leads to an increase, undesirable per se, in the overall length of the structural unit consisting of the motor and flanged-on gear.

SUMMARY OF THE INVENTION

The problem with which the invention is primarily concerned is to provide an improvement and a simplification in construction and manufacture here.

The design according to the present invention constitutes a solution to this.

This solution is based on the idea of bringing about the radial centering solely by means of the connection between the electric motor output shaft and the gear hollow shaft receiving this. For this purpose, the hollow shaft is mounted in an appropriately exact and stable manner within the gear case via a rolling bearing attached to the reception region. A design of the hollow shaft for the non-positive reception of the motor output shaft is especially advantageous.

Furthermore, such a gear is to be connectable, in a basic design remaining unchanged, to electric motors having different connecting geometries, that is to say different output shaft diameters and flange designs.

The absence of radial centering between the flange and electric motor housing is especially advantageous in the design according to the present invention. For, in this case, altogether four centering surfaces are dispensed with, since, in the case of a centered connection, such a compensating plate would have to be centered, on each of its end faces, relative to the respective bearing surface, that is to say the gear case, on the one hand, and relative to the electric motor housing, on the other hand.

When a compensating plate with only plane end faces as bearing surfaces is used, it can be produced simply and with great accuracy as regards the parallelism of its end faces. It is substantially more complicated and more costly if this plate had to be manufactured not only plane-parallel, but additionally also with radial centering surfaces. For to achieve this, the plate would have to be rechucked to allow different machining tools to be used. Also, in comparison with an only plane-parallel plate, additional outlay in terms of measurement would be necessary for the manufacturing inspection.

By means of the compensating sleeve provided according to claim 7, an identical basic gear case can be flanged onto electric motors having different output shaft diameters simply by the provision of correspondingly adapted compensating sleeves.

With the present invention an extremely efficient supply of gears for electric motors having different connecting geometries is possible.

As a result, the compensating plate has the same thickness in all cases. Such a compensating plate is adapted circumferentially to the respective different geometries of the electric motor output flange. This is possible in a very simple way without any variation in the basic gear design. Recesses matched to the individual mounting situation can also be worked in the motor-side bearing surface of the compensating plate for the purpose of a radially non-centered reception of a centering collar present on the output flange of the electric motor for other installation purposes.

In the basic gear design, the dimensions of the hollow shaft taking the form of a plug-in sleeve are such that, both in terms of length and in terms of diameter, it can receive virtually any motor shaft of electric motors usually capable of being flanged onto such gears. In terms of length, this presents no problem, since the reception length is merely to be designed for any predeterminable maximum length of a motor output shaft which is just still receivable. Shorter shafts then simply fill the reception region only partially in terms of length.

In terms of diameter, however, special compensating measures must be taken. This is done by the proposed use of compensating sleeves in the case of a basic hollow-shaft bore designed for the reception of a shaft having any predetermined maximum outside diameter. The basic gear can consequently be directly flanged, simply by the use of different compensating sleeves, onto electric motors having shaft diameters which are of any size within a predetermined range. In contrast to the hollow shaft, the compensating sleeves can be produced simply and therefore also in small quantities cost-effectively. They can either be kept in stock in a multiplicity of alternative designs or be produced in each individual case for a specific instance of use for an already existing basic gear, especially one kept in stock. The same applies to the compensating plates according to the invention.

Consequently, identical basic gear cases can be produced in large quantities and therefore cost-effectively and be adapted to the particular actual instances of use merely by means of different compensating plates and compensating sleeves.

Even the gear length can be varied extremely efficiently merely by a simple change in thickness of the compensating plate and an exchange of the hollow shaft, with the basic gear design otherwise remaining the same.

BRIEF DESCRIPTION OF THE DRAWINGS

An exemplary embodiment of the invention is represented in the drawing.

In this.

DETAILED DESCRIPTION OF THE PREFERRED EMBODIMENT

Figure 1:
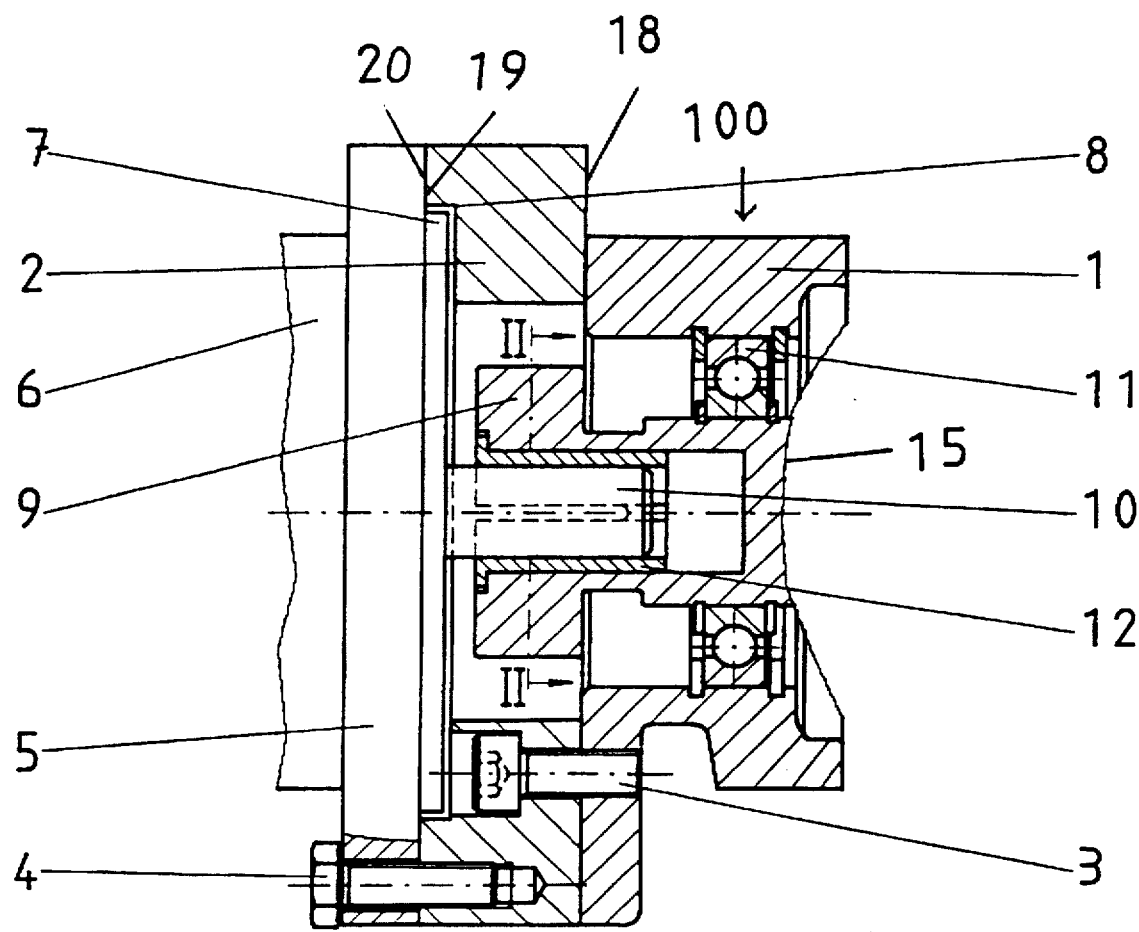
FIG. 1 shows a longitudinal section through the connection region of a planetary gear flanged onto an electric motor.
Figure 2:
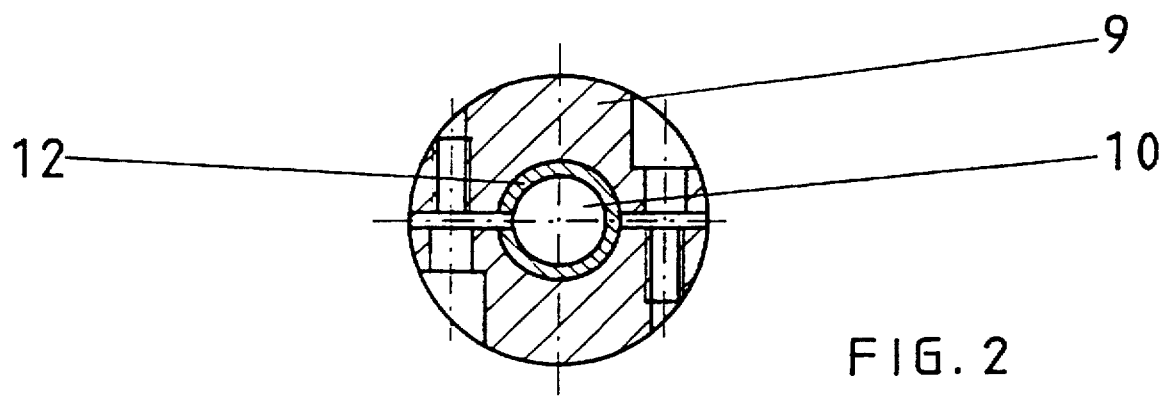
FIG. 2 shows a section along the line II—II through the plug-in sleeve portion of a gear hollow shaft receiving the output shaft of the electric motor.

The case 1 of a planetary gear 100 is flanged onto an electric motor 6 via gear flange in the form of a compensating plate 2. At the same time, the compensating plate 2 is connected, on the one hand, to the gear case 1 via screws 3 and, on the other hand, to the housing of the electric motor 6 via screws 4.

The compensating plate 2 has a bearing surface 19 that bears simply flat against the respective bearing surface 20 of the electric motor 6. There is no radial centering of the compensating plate 2 relative to the output flange 5 of the electric motor 6. In order to avoid this in an output flange 5 of an electric motor 6, said output flange having a centering collar 7, a recess 8 is worked into the compensating plate 2 on the motor side. The compensating plate 2 has a bearing surface 18 that also bears merely flat against the case 1 of the planetary gear and is exchangeable relative to this. The compensating plate 2 can be exchanged so that different mounting geometries of diverse electric motors 6 can be compensated. The different compensating plates 2 necessary for this purpose have in each instance only different outer dimensions, with the width, that is to say thickness, otherwise remaining basically the same.

The outer contour of a compensating plate can consequently easily be adapted in each instance to the corresponding contour of the motor output flange 5. The provision of a recess 8, described further above, for the radially centering-free reception of an electric motor output flange 5 having a centering collar 7 present on the latter for other mounting purposes can also be ensured simply in this way.

The radial centering between the planetary gear case 1 and the electric motor 6 is produced solely via the output shaft 10 of the electric motor 6, said output shaft engaging into a hollow driveshaft 9 of the planetary gear. For this purpose, the hollow shaft 9 is mounted in a centrically stable manner in the case 1 of the planetary gear via a rolling bearing 11 in the reception region 15 of the output shaft 10. The hollow shaft 9 itself is designed as a clampable, radially slotted plug-in sleeve, so that the output shaft 10 can be received non-positively with an exact fit.

So that a basic gear case with a hollow shaft 9 which is the same in each instance can be connected to electric motors 6 having output shafts 10 with different diameters, radially slotted compensating sleeves 12 of differing thickness can be used.

Thus, for electric motors 6 having different output geometries, identical basic gear cases, in each instance with only different compensating plates 2 and/or compensating sleeves 12, can be employed. Highly efficient production and stockkeeping are thereby possible.

We claim:

1. A low play planetary gears comprising:

a gear case flanged onto an electric motor having an output shaft and a bearing surface;

a hollow shaft having a reception region for non-positive reception of the output shaft;

rolling bearings arranged around the reception region for mounting the hollow shaft in a centrically fixed manner in the gear case; and a gear flange connected to the gear case and having a bearing surface rigidly connected in a radially centering free manner to the bearing surface of the electric motor.

2. The gear according to claim 1, wherein the hollow shaft is a radially slotted plug-in sleeve for a clamping connection between the hollow shaft and the output shaft.

3. The gear according to claim 1, wherein the gear flange is a compensating plate exchangeably fastened in a radially centering-free manner to the gear case and having bearing surfaces located plane-parallel one another.

4. The gear according to claim 1, further comprising a radially slotted compensating sleeve inserted into the hollow shaft when an electric motor with an output shaft having a diameter smaller than that of the hollow shaft is connected.

* * * * *